(12) United States Patent
Marupaduga et al.

(10) Patent No.: US 9,288,711 B1
(45) Date of Patent: Mar. 15, 2016

(54) SYSTEMS AND METHODS FOR DYNAMICALLY ADJUSTING DROP-TIMER THRESHOLDS BASED ON LOADING

(71) Applicant: Sprint Spectrum L.P., Overland Park, KS (US)

(72) Inventors: Sreekar Marupaduga, Overland Park, KS (US); Nicholas Kullman, Kansas City, MO (US); Andrew M. Wurtenberger, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 177 days.

(21) Appl. No.: 13/770,242

(22) Filed: Feb. 19, 2013

(51) Int. Cl.
*H04W 28/02* (2009.01)

(52) U.S. Cl.
CPC ................................ *H04W 28/0242* (2013.01)

(58) Field of Classification Search
CPC . H04L 1/0047; H04L 5/0058; H04W 74/002; H04W 36/0083; H04W 36/245; H04W 4/00; H04W 76/00; H04W 28/16; H04W 28/20; H04W 36/18; H04W 36/32; H04W 40/00; H04W 48/04; H04W 48/18; H04W 72/042; H04W 28/0242

See application file for complete search history.

(56) References Cited

U.S. PATENT DOCUMENTS

| | | | |
|---|---|---|---|
| 8,107,961 B1 * | 1/2012 | Vargantwar et al. | 455/436 |
| 8,363,622 B1 * | 1/2013 | Oroskar et al. | 370/332 |
| 2010/0015985 A1 * | 1/2010 | Chang et al. | 455/442 |

* cited by examiner

*Primary Examiner* — Ayaz Sheikh
*Assistant Examiner* — Debebe Asefa

(57) ABSTRACT

Disclosed herein are systems and methods for dynamically adjusting drop-timer thresholds based on loading. An embodiment takes the form of a method carried out by at least one network entity in a communication system that also includes a radio access network (RAN) providing wireless service to access terminals in a coverage area, in part by enforcing a drop timer having an associated start threshold and an associated stop threshold. The method includes determining a current level of load in the coverage area, and further includes adjusting one or both of the start threshold and the stop threshold based at least in part on the determined current level of load in the coverage area.

21 Claims, 5 Drawing Sheets

SYSTEMS AND METHODS FOR DYNAMICALLY ADJUSTING DROP-TIMER THRESHOLDS BASED ON LOADING

BACKGROUND

It is increasingly common for people to use client-side devices to communicate via a radio access network (RAN) with other devices, whether those devices are directly connected to the same RAN or to another network (such as another RAN or a transport network, as examples) to which that RAN directly or indirectly provides access. These client-side devices are generally referred to herein as access terminals, though this term is intended to broadly encompass devices known as mobile stations, mobile devices, user equipment, wireless-communication devices, cellphones, smartphones, personal digital assistants (PDAs), tablets, laptops, air cards, Universal Serial Bus (USB) dongles, and/or any other device or combination of devices capable of functioning as an access terminal according to this disclosure.

Typically, the wireless communications that are sent from the RAN to one or more access terminals are described as being sent on the "forward link," while those wireless communications that are sent from one or more access terminals to the RAN are described as being sent on the "reverse link." These communications are typically formatted in accordance with a wireless-communication protocol, one example type of which is known as code division multiple access (CDMA). Moreover, CDMA networks that operate according to industry specifications (IS) such as IS-95 and IS-2000 are often referred to as 1×RTT (or just "1×") networks, where 1×RTT stands for "Single Carrier Radio Transmission Technology."

Furthermore, some RANs operate according to a particular type of CDMA protocol known as EV-DO ("Evolution Data Optimized"). These RANs are generally configured to operate according to one or more versions of IS-856, and are designed to provide high-rate packet-data service, including Voice over Internet Protocol (IP) (VoIP) service, to access terminals using a technique that is known as time-division multiplexing (TDM) on the forward link and what is essentially 1×-CDMA technology on the reverse link.

More generally, RANs can be configured to operate according to any of numerous other wireless-communication protocols, some examples of which are Wi-Fi (IEEE 802.11), WiMAX (IEEE 802.16), Long Term Evolution (LTE), time division multiple access (TDMA), Global System for Mobile Communications (GSM), and the like.

In RANs that are of a type often known as wireless wide area networks (WWANs) (or cellular wireless networks), the entities with which access terminals communicate over the air interface are known by terms such as "base stations" and "access nodes," among others. These terms are sometimes used in different ways to refer to different entities. For example, the term "base station" is sometimes used to describe simply a device known as a base transceiver station (BTS), which contains the hardware, antennas, and so forth that actually conduct the over-the-air portion of the communication with the access terminals on behalf of the RAN. At times, however, the term "base station" or "access node" is used to refer to a combination of (i) one or more BTSs and (ii) a device known as a "base station controller" (BSC) (or "radio network controller" (RNC)), which controls the BTS(s) and connects it (them) to the rest of the network. In a typical scenario, an access terminal registers with a RAN via a particular BTS, and then operates in what is known as "idle mode" on a carrier frequency in a coverage area (e.g., a sector) provided by that BTS. If the access terminal is attempted to be contacted by another device, the RAN will typically page the access terminal via at least that particular BTS. The access terminal would typically respond by requesting and establishing communication on what is known as an air-interface traffic channel (or simply a "traffic channel"), and then conduct the relevant communication. In other instances, the access terminal is the initiator, in which case the access terminal typically sends the RAN an access-request message in order to request and establish communication on a traffic channel and then conduct the relevant communication.

OVERVIEW

In general, as part of providing wireless service to a given access terminal, a RAN (e.g., a particular a base station serving that access terminal) often enforces what is known as a "drop timer" with respect to any active communication sessions in which the access terminal is engaging. The RAN will typically similarly enforce a drop timer with respect to any active communication sessions in which any other one or more access terminals are engaging as well. These communication sessions could be voice calls, data sessions, and/or any other suitable type of communication session. For ease of explanation, these communication sessions are referred to generally as "calls" in the ensuing description, though this is not meant by way of exclusion with respect to any one or more types of communication sessions in which a given access terminal could be engaged at a given time.

In general, the RAN uses the drop timer to reclaim air-interface resources that had been allocated with respect to a call when it appears to the RAN that that call can no longer be (or is no longer being) successfully conducted. Thus, the drop timer is used to reclaim air-interface resources based on unacceptable decreases in communication quality, as opposed to what is known as the active-to-dormant timer, which in general is used by RANs to reclaim allocated air-interface resources that the associated access terminals have not even attempted to use for a certain amount of time.

As such, and using frames as an example unit of time during which a base station receives data from an access terminal during a call, the base station may allocate air-interface resources to a given access terminal for engaging in a given call, and then begin exchanging frames with the access terminal to facilitate the conducting of that call. At some point during the call, the base station may detect that it has not successfully received and decoded any (or perhaps at least a threshold number) of a previous first number of consecutive frames, and may responsively start a drop timer in connection with the associated call. This previous first number of consecutive frames, which also corresponds of course with a predefined previous first amount of time, is the start threshold associated with the drop timer.

When the start threshold is met, the base station responsively begins decrementing a drop timer associated with the call. If that drop timer expires, the base station reclaims the allocated air-interface resources and considers the call to have been dropped. If, however, during the decrementing of the drop timer, the base station successfully receives and decodes at least a second number of frames—which the base station may or may not require to be consecutive, the base station will responsively cancel that particular drop timer for that call. This second number of frames is the stop threshold associated with the drop timer.

In current implementations, networks are configured to use static values for the start and stop thresholds associated with the drop timer, perhaps always using a first static value for its drop-timer start threshold and always using a second (perhaps different than the first) static value for its drop-timer stop threshold. This manner of operation often leads to suboptimal use of network resources. For example, a network may wastefully allow air-interface resources to be occupied by calls for too long during periods when the load in the coverage area (and accordingly the demand for air-interface resources) is high. As another example, a network may wastefully reclaim air-interface resources too soon (often necessitating a nearly immediate reallocation of resources) when the load in the coverage area (and accordingly the demand for air-interface resources) is low.

To address these drawbacks as well as others, presently disclosed are methods and systems for dynamically adjusting drop-timer thresholds based on loading. One embodiment takes the form of a method carried out by a communication system that comprises at least one network entity and further comprises a RAN providing wireless service to access terminals in a coverage area. Providing the wireless service comprises enforcing a drop timer having an associated start threshold and an associated stop threshold. The method includes determining a current level of load in the coverage area. The method further includes adjusting one or both of the start and stop threshold based at least in part on the determined current level of load in the coverage area.

It is noted that load in a coverage area may be measured and/or expressed in one or more of various different ways, some non-limiting examples including amount of reverse noise, forward-link and/or reverse-link signal strength, forward-link and/or reverse-link signal-to-noise ratio (SINR), number of access terminals in the coverage area, and number of traffic channels currently allocated in the coverage area.

Another embodiment takes the form of at least one network entity that includes a communication interface, a processor, and data storage containing program instructions that are executable by the processor for carrying out the just-described method.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, in which like numerals denote like entities.

DETAILED DESCRIPTION

I. Introduction

The present systems and methods will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

II. Example Architecture

A. Example Communication System

Figure 1:
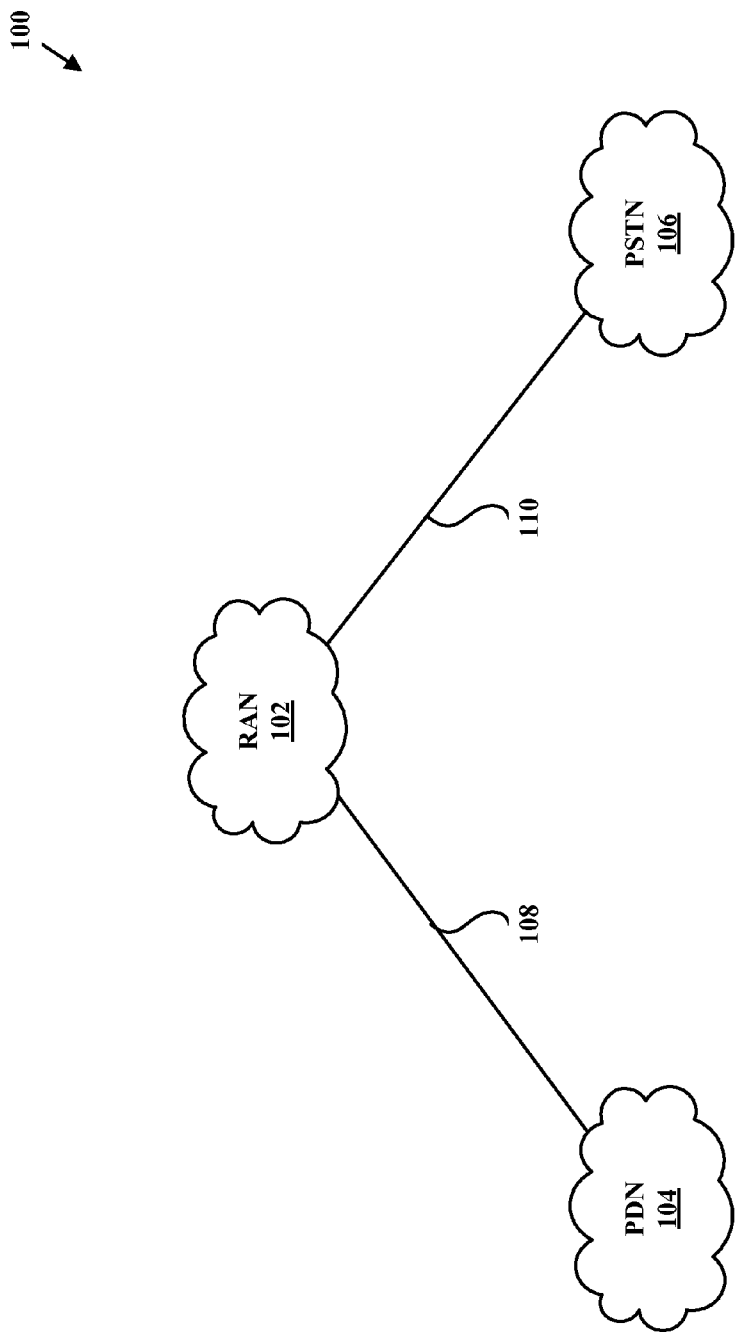
FIG. 1 depicts an example communication system.

Referring to the drawings, FIG. 1 depicts a communication system 100 that includes a RAN 102, a packet-data network (PDN) 104, and a public switched telephone network (PSTN) 106. RAN 102 communicates with PDN 104 via a communication link 108, and with PSTN 106 via a communication link 110; either or both of these communications links may include one or more wired and/or wireless interfaces.

B. Example Radio Access Network (RAN)

Figure 2:
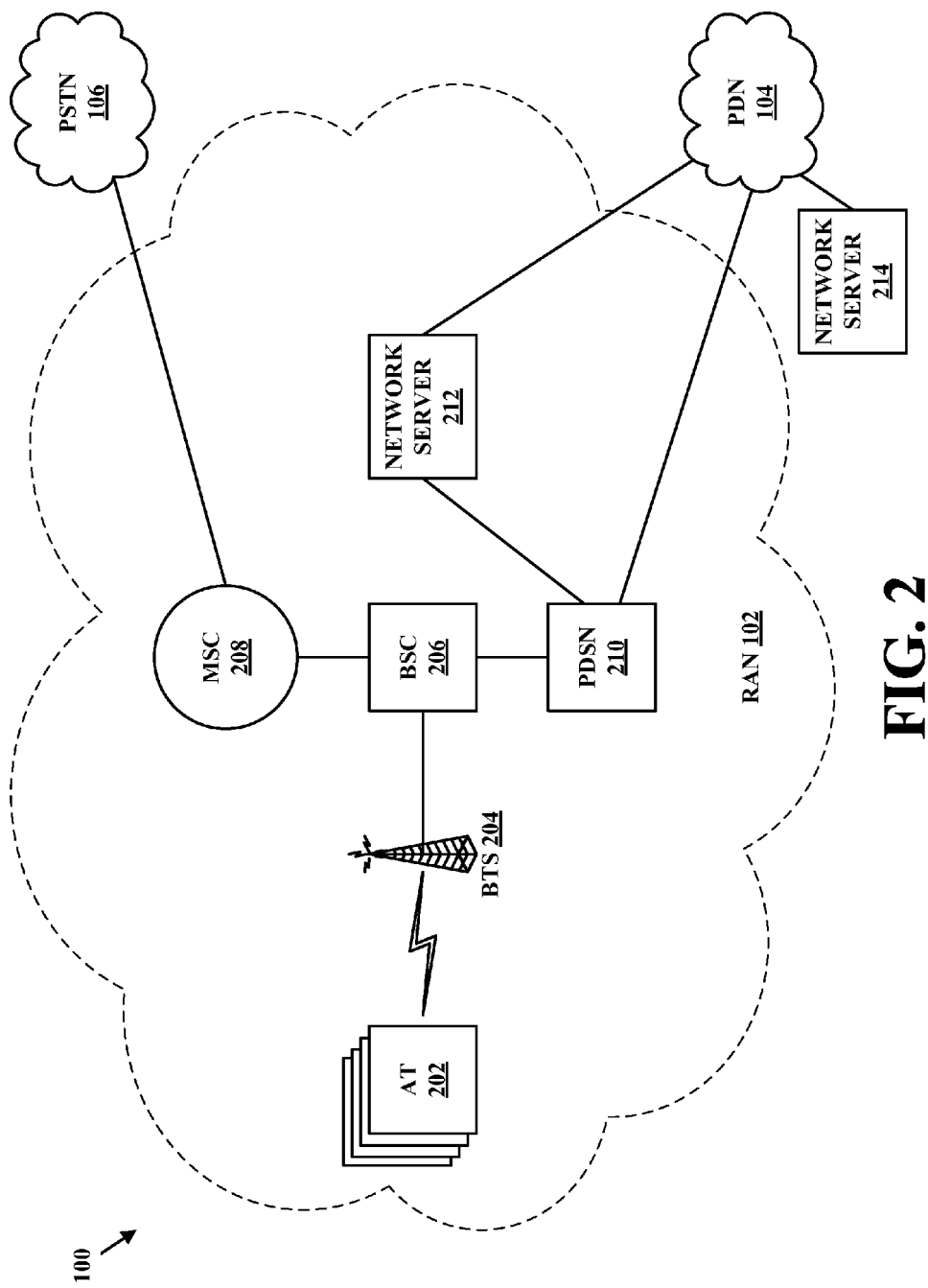
FIG. 2 depicts an example radio access network (RAN) in the context of the example communication system of FIG. 1.

FIG. 2 depicts communication system 100 with a more detailed depiction of RAN 102, which is shown in this example as including a plurality of access terminals 202, a BTS 204, a BSC 206, a mobile switching center (MSC) 208, a packet data serving node (PDSN) 210, and network servers 212 and 214. Additional entities could also be present, such as additional access terminals in communication with BTS 204, additional entities in communication with PDN 104 and/or PSTN 106, etc. Also, there could be one or more routers, switches, and/or other devices or networks making up at least part of one or more of the communication links. And other variations are possible as well.

An example access terminal is described below in connection with FIG. 3, while an example network entity is described below in connection with FIG. 4. The example access terminal could represent any one or more of the access terminals 202, while the example network entity could represent any one or any combination of BTS 204, BSC 206, MSC 208, PDSN 210, network server 212, network server 214, one or more other network servers, and/or one or more other devices and/or entities of any other type that are suitably arranged, programmed, and configured to, alone and/or in various combinations, carry out the functions described herein as being carried out by at least one network entity.

BTS 204 generally functions to provide one or more coverage areas on one or more carrier frequencies, and to interface between air-interface communications with access terminals on the one hand and "backhaul" communications with BSC 206 on the other hand. BSC 206 generally functions to control one or more BTSs, and to provide one or more BTSs with connections to devices such as MSC 208 and PDSN 210. MSC 208 generally functions to connect BSCs to circuit-switched networks such as PSTN 106, and serves at least a telephone-switch function to facilitate such connections.

PDSN 210 generally functions to connect BSCs to devices such as network server 212 and to packet-switched networks such as PDN 104, which could be the Internet; as such, PDSN 210 serves at least a network-access-server (NAS) function to facilitate such connections. One or both of network server 212 and network server 214 may, among other operations, carry out one or more of the functions described herein as being carried out by at least one network entity.

C. Example Access Terminal

Figure 3:
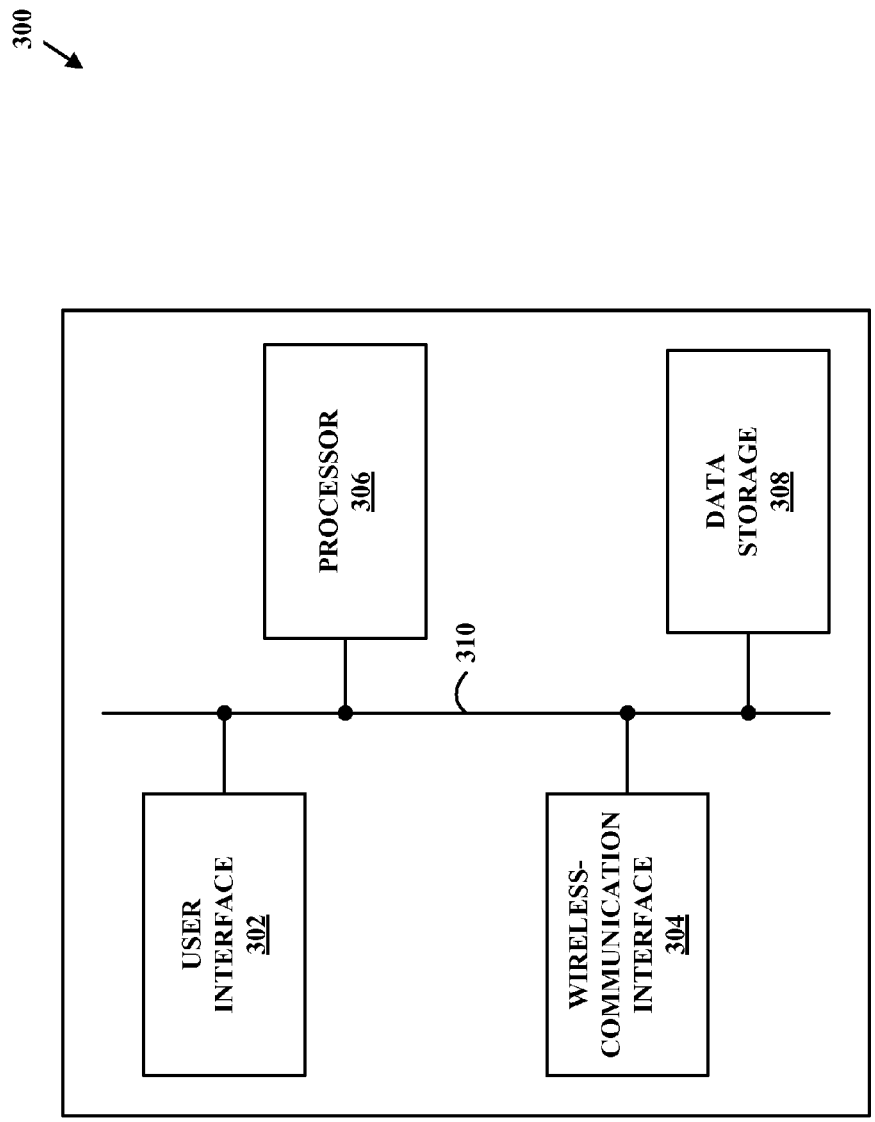
FIG. 3 depicts an example access terminal.

FIG. 3 depicts an example access terminal 300 as including a user interface 302, a wireless-communication interface 304, a processor 306, and data storage 308, all of which may be coupled together by a system bus, network, or other communication mechanism 310.

User interface 302 may include one or more input devices such as a touchscreen, one or more buttons, a microphone, and the like for receiving inputs from users, as well as one or more output devices such as a display, one or more indicator lights, a speaker, and the like for communicating outputs to users. Wireless-communication interface 304 may comprise one or more antennae and one or more chipsets for communicating with one or more base stations over respective air interfaces. As an example, one such chipset could be one that is suitable for CDMA communication. As another example, one such chipset could be one that is suitable for LTE communication. The chipset or wireless-communication interface in general may also or instead be arranged to communicate according to one or more other types (e.g., protocols) mentioned herein and/or any others now known or later developed.

Processor 306 may comprise one or more general-purpose processors and/or one or more special-purpose processors, and may be integrated in whole or in part with wireless-communication interface 304. Data storage 308 may comprise one or more volatile and/or non-volatile storage components (such as magnetic, optical, flash, or other non-transitory storage), and may be integrated in whole or in part with processor 306. And certainly other configurations are possible. Data storage 308 may contain program instructions executable by processor 306 for carrying out various access-terminal functions described herein.

D. Example Network Entity

Figure 4:
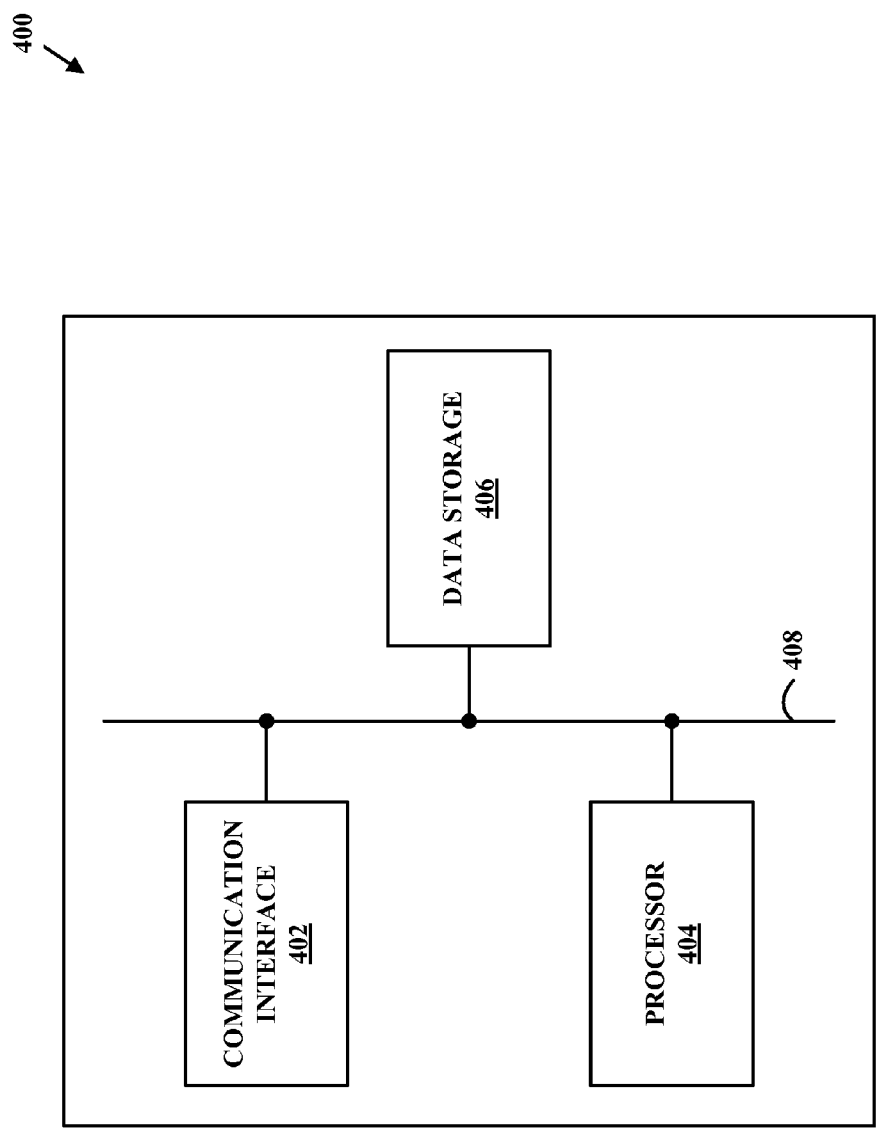
FIG. 4 depicts an example network entity.

FIG. 4 depicts an example network entity 400 as including a communication interface 402, a processor 404, and data storage 406, all of which may be coupled together by a system bus, network, or other communication mechanism 408. Communication interface 402 may include one or more interfaces (e.g., an Ethernet card) for engaging in wired communication and/or one or more interfaces (e.g., a Wi-Fi interface) for engaging in wireless communication.

Processor 404 may comprise one or more general-purpose processors and/or one or more special-purpose processors, and may be integrated in whole or in part with communication interface 402. Data storage 406 may comprise one or more volatile and/or non-volatile storage components (such as magnetic, optical, flash, or other non-transitory storage), and may be integrated in whole or in part with processor 404. And certainly other configurations are possible. Data storage 406 may contain program instructions executable by processor 404 for carrying out various network-entity functions described herein. Network entity 400 may also have a user interface and/or one or more other components deemed suitable for various contexts.

III. Example Operation

Figure 5:
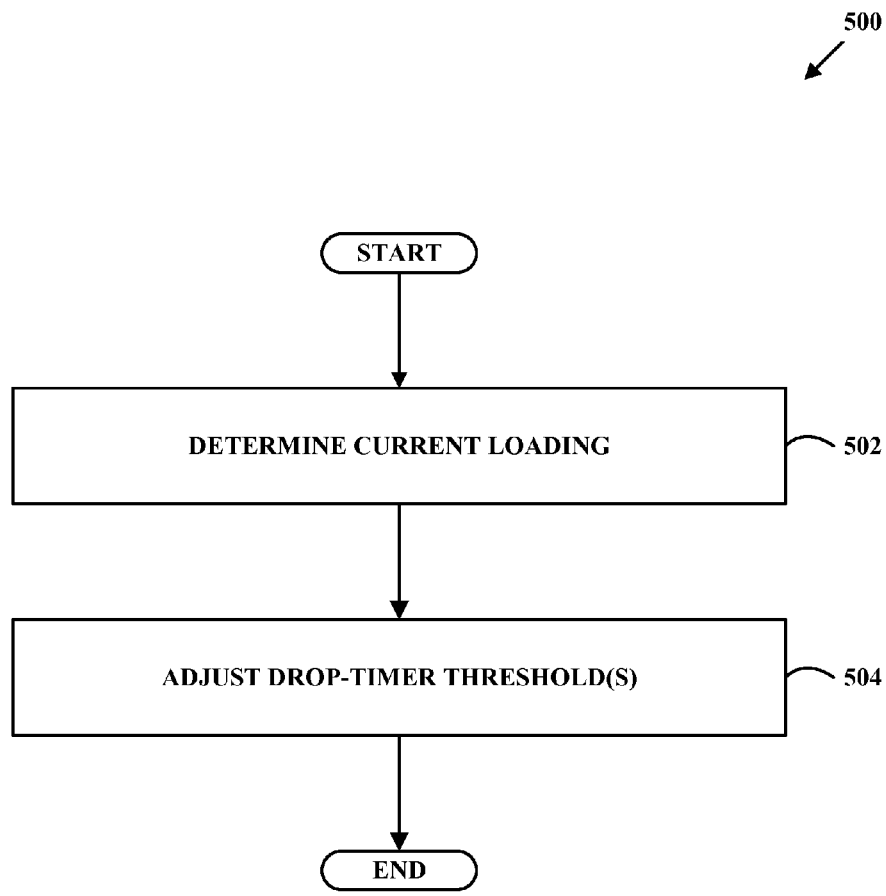
FIG. 5 depicts functions carried out in accordance with at least one embodiment.

FIG. 5 is a flowchart that depicts functions carried out in accordance with at least one embodiment. More particularly, FIG. 5 depicts a method 500 carried out by at least one network entity in a communication system that includes a RAN providing wireless service to access terminals in a coverage area, where providing the wireless service includes enforcing a drop timer that has an associated start threshold and an associated stop threshold.

Method 500 begins at 502, with the at least one network entity determining a current level of load in the coverage area. As described above, load in a coverage area may be measured and/or expressed in one or more of various different ways, some non-limiting examples including amount of reverse noise, forward-link and/or reverse-link signal strength, forward-link and/or reverse-link signal-to-noise ratio (SINR), number of access terminals in the coverage area, and number of traffic channels currently allocated in the coverage area. And certainly one or more other metrics could be used, as deemed suitable in a given implementation.

Method 500 continues at 504, with the at least one network entity adjusting one or both of the start threshold and the stop threshold based at least in part on the determined current level of load in the coverage area.

In one or more embodiments, the at least one network entity may compare the current level of load to one or more thresholds, and may accordingly determine that the current level of load is either high or low. In some embodiments, a single load threshold could be involved, where current levels of load above that single load threshold are considered high and where current levels of load below that single load threshold are considered low. In some embodiments, two thresholds could be involved, where current levels of load above the greater of the two thresholds are considered high, where current levels of load below the lesser of the two thresholds are considered low, and where current levels of load between the two thresholds are considered neither high nor low. And certainly other implementations are possible.

In some instances, the at least one network entity determines that the current level of load in the coverage area is low. In such instances, the at least one network entity may responsively (i) increase the start threshold, (ii) decrease the stop threshold, or (iii) both increase the start threshold and decrease the stop threshold.

In other instances, the at least one network entity determines that the current level of load in the coverage area is high. In such instances, the at least one network entity may responsively (i) decrease the start threshold, (ii) increase the stop threshold, or (iii) both decrease the start threshold and increase the stop threshold.

Stated more generally, adjusting one or both of the start threshold and the stop threshold could involve (i) adjusting the start threshold and not adjusting the stop threshold, (ii) adjusting the stop threshold and not adjusting the start threshold, or (iii) adjusting both the start threshold and the stop threshold. In at least one embodiment, the method 500 is carried out repeatedly so as to iteratively adjust one or both of the start threshold and the stop threshold based on at least in part on a changing level of load in the coverage area. In at least one embodiment, in addition to adjusting one or both of the start threshold and the stop threshold, the at least one network entity also adjusts the duration of the drop timer itself based at least in part on the determined current level of load in the coverage area.

IV. Conclusion

While some example embodiments have been described above, those of ordinary skill in the art will appreciate that numerous changes to the described embodiments could be made without departing from the scope and spirit of the claims.

What is claimed is:

1. In a communication system that comprises at least one network entity and further comprises a radio access network (RAN) providing wireless service to access terminals (ATs) in a coverage area, wherein providing the wireless service comprises enforcing a drop timer having an associated start threshold and an associated stop threshold, a method carried out by the at least one network entity, the method comprising:

determining a current level of load in the coverage area; and adjusting one or both of the start threshold and the stop threshold based at least in part on the determined current level of load in the coverage area, wherein the drop timer defines how long the RAN waits after detecting threshold poor communication quality with a served AT before the RAN responsively drops communication with the AT, wherein the start threshold defines how long the RAN waits after detecting threshold poor communication quality with the served AT before the RAN responsively starts the drop timer, and wherein the stop threshold defines how long the RAN waits after detecting threshold good communication quality with the served AT while the drop timer is running, before the RAN responsively stops the drop timer.

2. The method of claim 1, further comprising determining that the current level of load in the coverage area is low, wherein adjusting one or both of the start threshold and the stop threshold based at least in part on the determined current level of load in the coverage area comprises increasing the start threshold.

3. The method of claim 1, further comprising determining that the current level of load in the coverage area is low, wherein adjusting one or both of the start threshold and the stop threshold based at least in part on the determined current level of load in the coverage area comprises decreasing the stop threshold.

4. The method of claim 1, further comprising determining that the current level of load in the coverage area is low, wherein adjusting one or both of the start threshold and the stop threshold based at least in part on the determined current level of load in the coverage area comprises increasing the start threshold and decreasing the stop threshold.

5. The method of claim 1, further comprising determining that the current level of load in the coverage area is high, wherein adjusting one or both of the start threshold and the stop threshold based at least in part on the determined current level of load in the coverage area comprises decreasing the start threshold.

6. The method of claim 1, further comprising determining that the current level of load in the coverage area is high, wherein adjusting one or both of the start threshold and the stop threshold based at least in part on the determined current level of load in the coverage area comprises increasing the stop threshold.

7. The method of claim 1, further comprising determining that the current level of load in the coverage area is high, wherein adjusting one or both of the start threshold and the stop threshold based at least in part on the determined current level of load in the coverage area comprises decreasing the start threshold and increasing the stop threshold.

8. The method of claim 1, further comprising adjusting a duration of the drop timer based at least in part on the determined current level of load in the coverage area.

9. The method of claim 1, wherein adjusting one or both of the start threshold and the stop threshold comprises adjusting the start threshold and not adjusting the stop threshold.

10. The method of claim 1, wherein adjusting one or both of the start threshold and the stop threshold comprises adjusting the stop threshold and not adjusting the start threshold.

11. The method of claim 1, wherein adjusting one or both of the start threshold and the stop threshold comprises adjusting both the start threshold and the stop threshold.

12. The method of claim 1, carried out repeatedly so as to iteratively adjust one or both of the start threshold and the stop threshold based at least in part on a changing level of load in the coverage area.

13. In a communication system that comprises a radio access network (RAN) providing wireless service to access terminals (ATs) in a coverage area, wherein providing the wireless service comprises enforcing a drop timer having an associated start threshold and an associated stop threshold, at least one network entity comprising:

a communication interface;

a processor; and data storage containing instructions executable by the processor for carrying out a set of functions, the set of functions including:

determining a current level of load in the coverage area; and adjusting one or both of the start threshold and the stop threshold based at least in part on the determined current level of load in the coverage area, wherein the drop timer defines how long the RAN waits after detecting threshold poor communication quality with a served AT before the RAN responsively drops communication with the AT, wherein the start threshold defines how long the RAN waits after detecting threshold poor communication quality with the served AT before the RAN responsively starts the drop timer, and wherein the stop threshold defines how long the RAN waits after detecting threshold good communication quality with the served AT while the drop timer is running, before the RAN responsively stops the drop timer.

14. The at least one network entity of claim 13, the set of functions further including determining that the current level of load in the coverage area is low, wherein adjusting one or both of the start threshold and the stop threshold based at least in part on the determined current level of load in the coverage area comprises increasing the start threshold.

15. The at least one network entity of claim 13, the set of functions further including determining that the current level of load in the coverage area is low, wherein adjusting one or both of the start threshold and the stop threshold based at least in part on the determined current level of load in the coverage area comprises decreasing the stop threshold.

16. The at least one network entity of claim 13, the set of functions further including determining that the current level of load in the coverage area is low, wherein adjusting one or both of the start threshold and the stop threshold based at least in part on the determined current level of load in the coverage area comprises increasing the start threshold and decreasing the stop threshold.

17. The at least one network entity of claim 13, the set of functions further including determining that the current level of load in the coverage area is high, wherein adjusting one or both of the start threshold and the stop threshold based at least in part on the determined current level of load in the coverage area comprises decreasing the start threshold.

18. The at least one network entity of claim 13, the set of functions further including determining that the current level of load in the coverage area is high, wherein adjusting one or both of the start threshold and the stop threshold based at least in part on the determined current level of load in the coverage area comprises increasing the stop threshold.

19. The at least one network entity of claim 13, the set of functions further including determining that the current level of load in the coverage area is high, wherein adjusting one or both of the start threshold and the stop threshold based at least in part on the determined current level of load in the coverage area comprises decreasing the start threshold and increasing the stop threshold.

20. The at least one network entity of claim 13, the set of functions further including adjusting a duration of the drop timer based at least in part on the determined current level of load in the coverage area.

21. The method of claim 1, wherein the at least one network entity is part of the radio access network.

* * * * *